United States Patent [19]
Takase et al.

[11] Patent Number: 6,069,337
[45] Date of Patent: May 30, 2000

[54] FUEL TANK FOR MOTORCYCLE, AND PROCESS FOR PRODUCING THE SAME

[75] Inventors: Yoshimitsu Takase; Joji Fujinami, both of Shizuoka, Japan

[73] Assignee: Honda Giken Kogyo Kabushiki Kaisha, Tokyo, Japan

[21] Appl. No.: 09/219,845

[22] Filed: Dec. 23, 1998

[30] Foreign Application Priority Data

Dec. 24, 1997 [JP] Japan .................................... 9-355473

[51] Int. Cl.⁷ .................................................. A23K 11/06
[52] U.S. Cl. ........................................... 219/83; 219/117.1
[58] Field of Search .................................. 219/83, 117.1, 219/81, 82

[56] References Cited

U.S. PATENT DOCUMENTS

| | | | |
|---|---|---|---|
| 4,652,718 | 3/1987 | Fujita et al. ................................ | 219/82 |
| 4,652,719 | 3/1987 | Fujita et al. ................................ | 219/82 |
| 4,785,153 | 11/1988 | Stimmel .................................... | 219/82 |
| 5,010,226 | 4/1991 | Sato et al. .................................. | 219/81 |
| 5,391,853 | 2/1995 | Grau et al. ................................ | 219/83 |
| 5,471,026 | 11/1995 | Ilies ......................................... | 219/83 |

*Primary Examiner*—Clifford C. Shaw
*Attorney, Agent, or Firm*—Arent, Fox, Kintner, Plotkin & Kahn

[57] ABSTRACT

A fuel tank for a motorcycle includes a body panel, and a bottom plate. The bottom plate occludes an opening at a lower end of the panel and has an outer surface which is recessed inwards of the panel. A first junction flange portion which is integrally formed on a peripheral edge of the opening at the lower end of the body panel and a second junction flange portion which is integrally formed on an outer peripheral edge of the bottom plate, are superposed on each other and seam-welded to each other. The first and second junction flange portions are formed turned toward the center of the opening at the lower end of the body panel, so that they are not visible from the sides of the tank. Thus, the appearance of the fuel tank can be improved to enhance marketability, while enhancing the air-tightness of the tank and welding operability.

1 Claim, 8 Drawing Sheets

FUEL TANK FOR MOTORCYCLE, AND PROCESS FOR PRODUCING THE SAME

BACKGROUND OF THE INVENTION

1. Field of the Invention

The present invention relates to a fuel tank for a motorcycle, and a process for producing the same.

2. Description of the Related Art

A conventional fuel tank for a motorcycle includes a body panel forming a main body of the tank, and a bottom plate which occludes an opening at a lower end of the body panel and whose outer surface is recessed inwards of the panel. A first junction flange portion which is integrally formed on a peripheral edge of the opening at the lower end of the body panel and a second junction flange portion which is integrally formed on an outer peripheral edge of the bottom plate are superposed on each other and seam-welded to each other over their entire peripheries. A structure in which the flanges are bonded by the seam-welding, has an advantage that a higher air tightness can be provided between the body panel and the bottom plate to enhance reliability. Moreover, the welding operability can be improved. The reason why the bottom plate is recessed inwards of the body panel (i.e., inwards of the tank), is that when the fuel tank is supported on a vehicle frame of the motorcycle, interference between the tank bottom and the vehicle body is avoided.

The conventional structure suffers from the following problem: Both of the first junction flange $2f$ of the body panel $2'$ and the second junction flange $3f$ of the bottom plate $3'$ are formed, turned downwards, and protrude prominently downwards from the bottom surface of the tank body $1'$, as shown in FIGS. 8A and 8B. For this reason, poor appearance results in a degraded marketability. Also, space occupied by the tank itself is increased by an amount corresponding to the protrusion of the junction flanges $2f$ and $3f$.

SUMMARY OF THE INVENTION

Accordingly, it is an object of the present invention to provide a fuel tank for a motorcycle, and a process for producing the same, wherein the above problem associated with the conventional structure can be solved, while sustaining the above advantage by seam-welding the flanges of the body panel and the bottom plate to each other.

To achieve the above object, according to a first aspect and feature of the present invention, there is provided a fuel tank for a motorcycle, comprising a body panel, and a bottom plate which occludes an opening at a lower end of the body panel and whose outer surface is recessed inwards of the panel. A first junction flange portion is integrally formed on a peripheral edge of the opening at the lower end of the body panel. A second junction flange portion is integrally formed on an outer peripheral edge of the bottom plate. The first and second junction flange portions are superposed on each other and seam-welded to each other. The first and second junction flanges portions are formed, turned toward the center of the opening at the lower end of the body panel, so that they are not visible from the sides of the tank.

With this first feature, even if the first junction flange of the peripheral edge of the opening at the lower end of the body panel and the second junction flange of the outer peripheral edge of the bottom plate are seam-welded to each other, the junction flanges do not protrude downwards from a bottom surface of the fuel tank and are not visible from the sides of the tank. Therefore, the appearance of the fuel tank can be improved to enhance marketability. Furthermore, the size of the fuel tank itself can be reduced in an amount corresponding to the amount the junction flanges do not protrude outward from the tank. Moreover, a high air tightness can be provided to the tank due to seam-welding between the body panel and the bottom plate to enhance reliability. Finally, welding operability can be improved.

According to a second aspect and feature of the present invention, there is provided a process for producing a fuel tank for a motorcycle, comprising a first step of temporarily fixing a body panel and a bottom plate in a state in which their junction flanges have been turned toward a center of an opening at a lower end and superposed on each other, and a second step of seam-welding the junction flanges to each other over their entire peripheries after the temporary fixing. The seam-welding is carried out in a state in which one of a pair of electrode rings of a seam-welding machine and an electrode support for rotatably supporting the one electrode ring have been placed down into a recessed portion of the bottom plate, and the junction flanges have been sandwiched between the one electrode ring and the other electrode ring which is disposed outside the body panel.

With the second feature, it is possible to easily and properly carry out seam-welding of the junction flanges which are turned toward the center of the opening at the lower end since the body panel and the bottom plate have been temporarily fixed, and the one electrode and the electrode ring have been placed down into the recessed portion of the bottom plate.

The above and other objects, features and advantages of the invention will become apparent from the following description of the preferred embodiment taken in conjunction with the accompanying drawings.

DETAILED DESCRIPTION OF THE PREFERRED EMBODIMENT

The present invention will now be described by way of an embodiment with reference to the accompanying drawings.

Figure 1A:
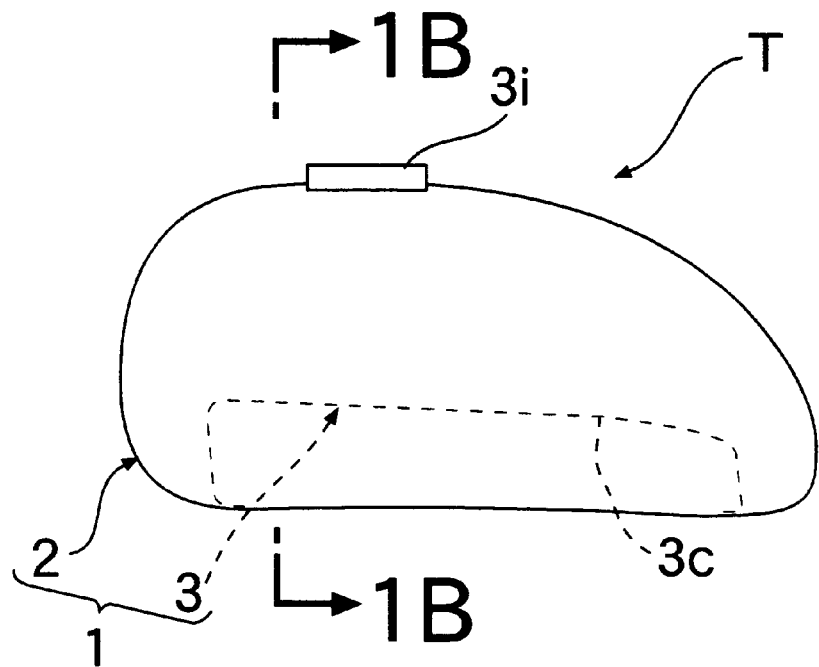
FIG. 1A is a side view of a fuel tank according to an embodiment of the present invention.
Figure 1B:
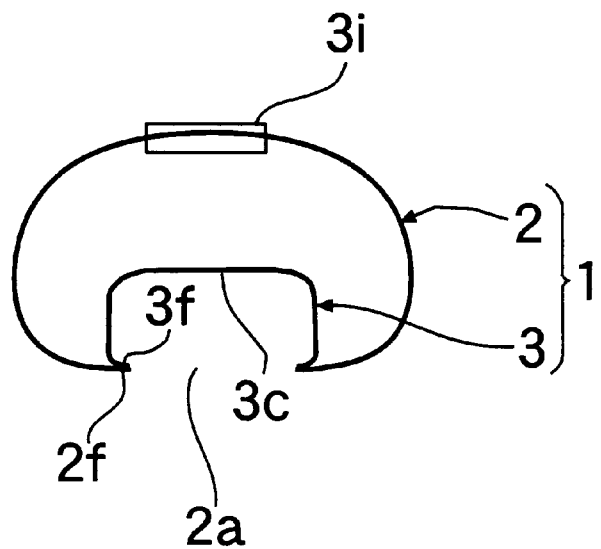
FIG. 1B is a sectional view taken along a line B—B in FIG. 1A.
Figure 2:
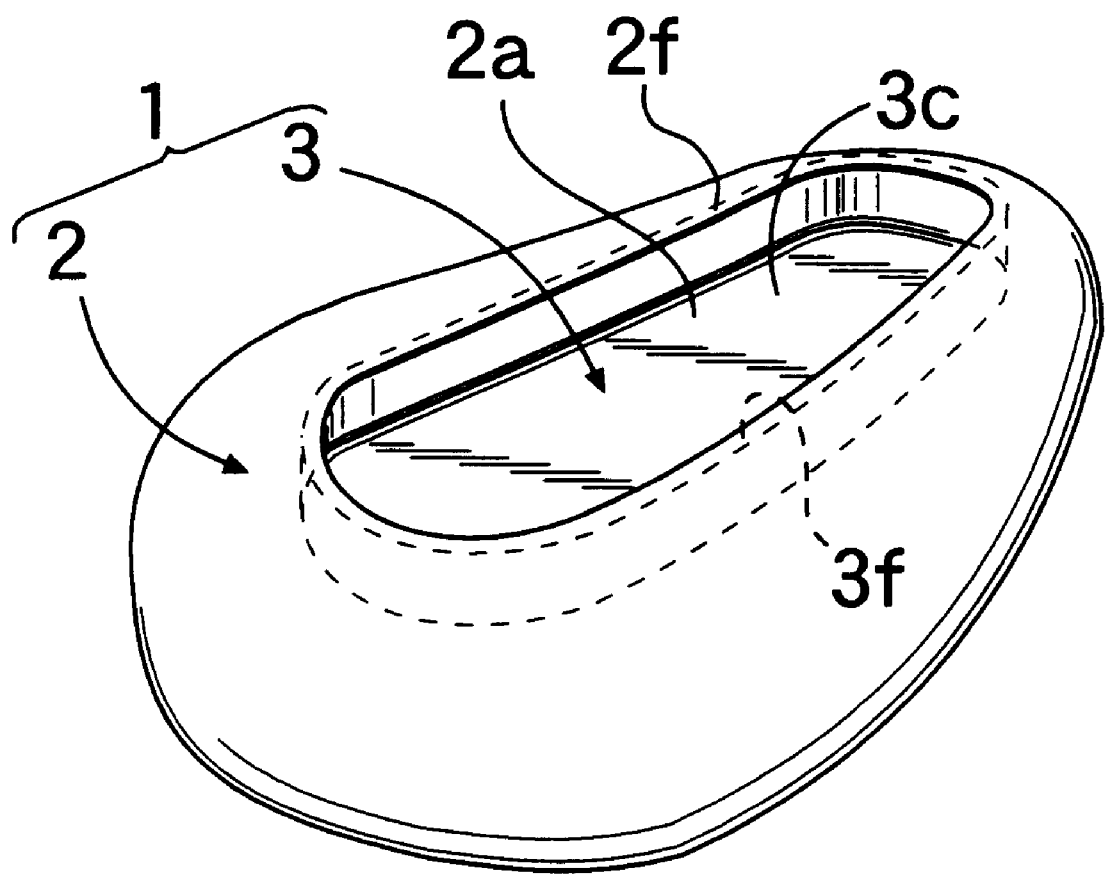
FIG. 2 is a perspective view showing the fuel tank in an upside-down state.

Referring first to FIGS. 1 and 2, a tank body 1 of a fuel tank for a motorcycle is comprised of a dome-shaped body panel 2 which is longer in a longitudinal direction of a vehicle body and which forms a main portion of the tank body, and a bottom plate 3 which occludes an opening 2a at a lower end of the body panel and which extends in the longitudinal direction of the vehicle body and which has an outer surface recessed deeply inwards of the panel 2. A fuel supply tube 3i as a fuel supply port is post-secured to an upper portion of the body panel 2.

A first junction flange portion 2f is integrally formed on a peripheral edge of the opening 2a at the lower end of the body panel 2. A second junction flange portion 3f is integrally formed on an outer peripheral edge of the bottom plate 3. The junction flange portions 2f and 3f are superposed on each other and seam-welded at W to each other, whereby a good air tightness of the tank T is maintained. The first and second junction flange portions 2f and 3f are formed turned toward a center of the opening 2a at the lower end of the body panel 2, i.e., turned inwards, so that the flange portions 2f and 3f are not visible from the sides of the fuel tank T. With such a structure in which the flanges of the body panel 2 and the bottom plate 3 are bonded, the junction flanges 2f and 3f do not protrude outwards (downwards of the tank) from the bottom of the tank. Namely, the junction flanges 2f and 3f are not visible from the sides of the fuel tank. Therefore, the appearance of the fuel tank T can be improved to enhance marketability. Moreover, the fuel tank T itself is reduced in size by an amount corresponding to the amount the junction flanges 2f and 3f do not protrude outside the tank.

Figure 3:
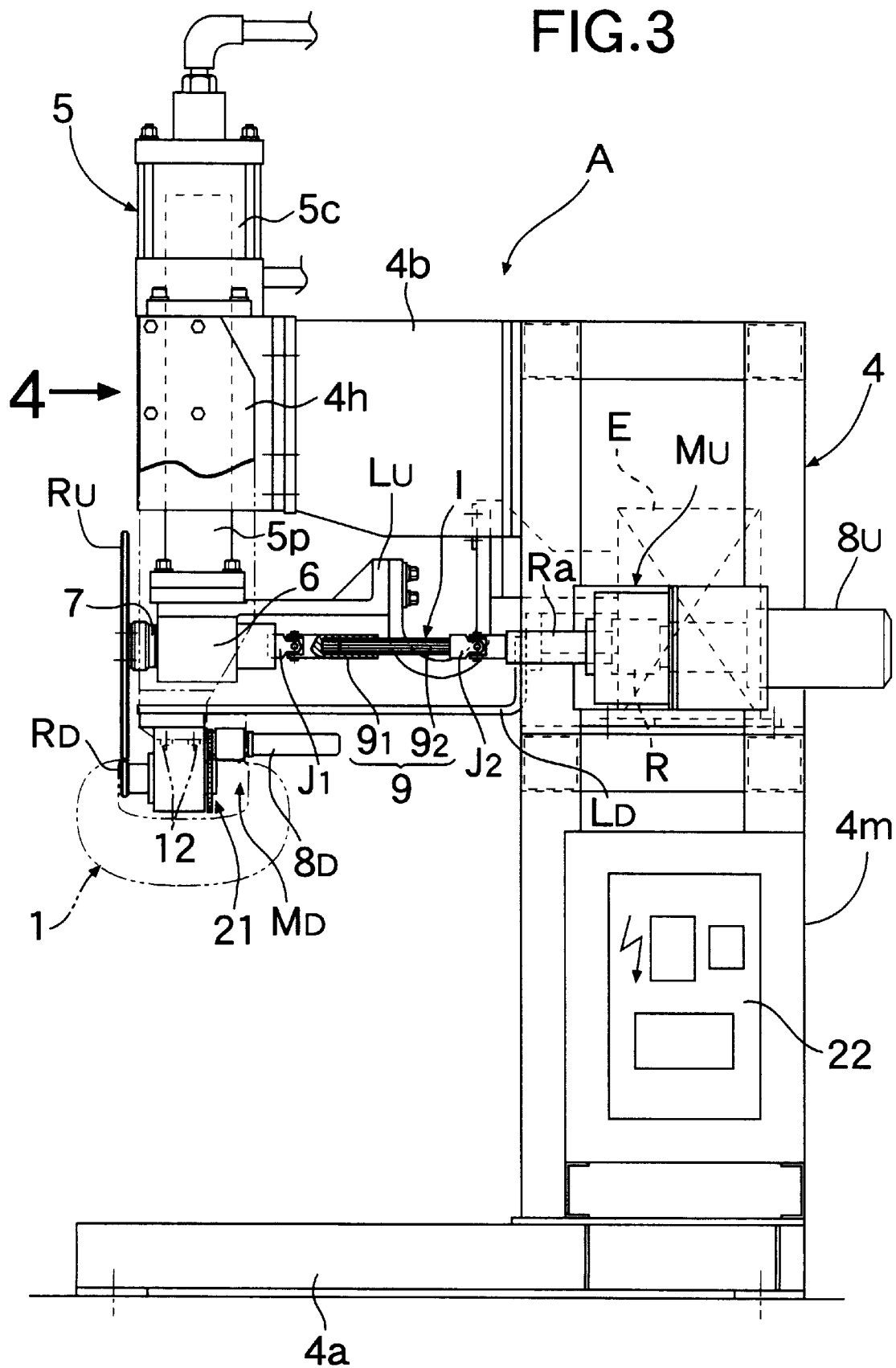
FIG. 3 is a side view of the entire arrangement of a seam-welding machine.
Figure 4:
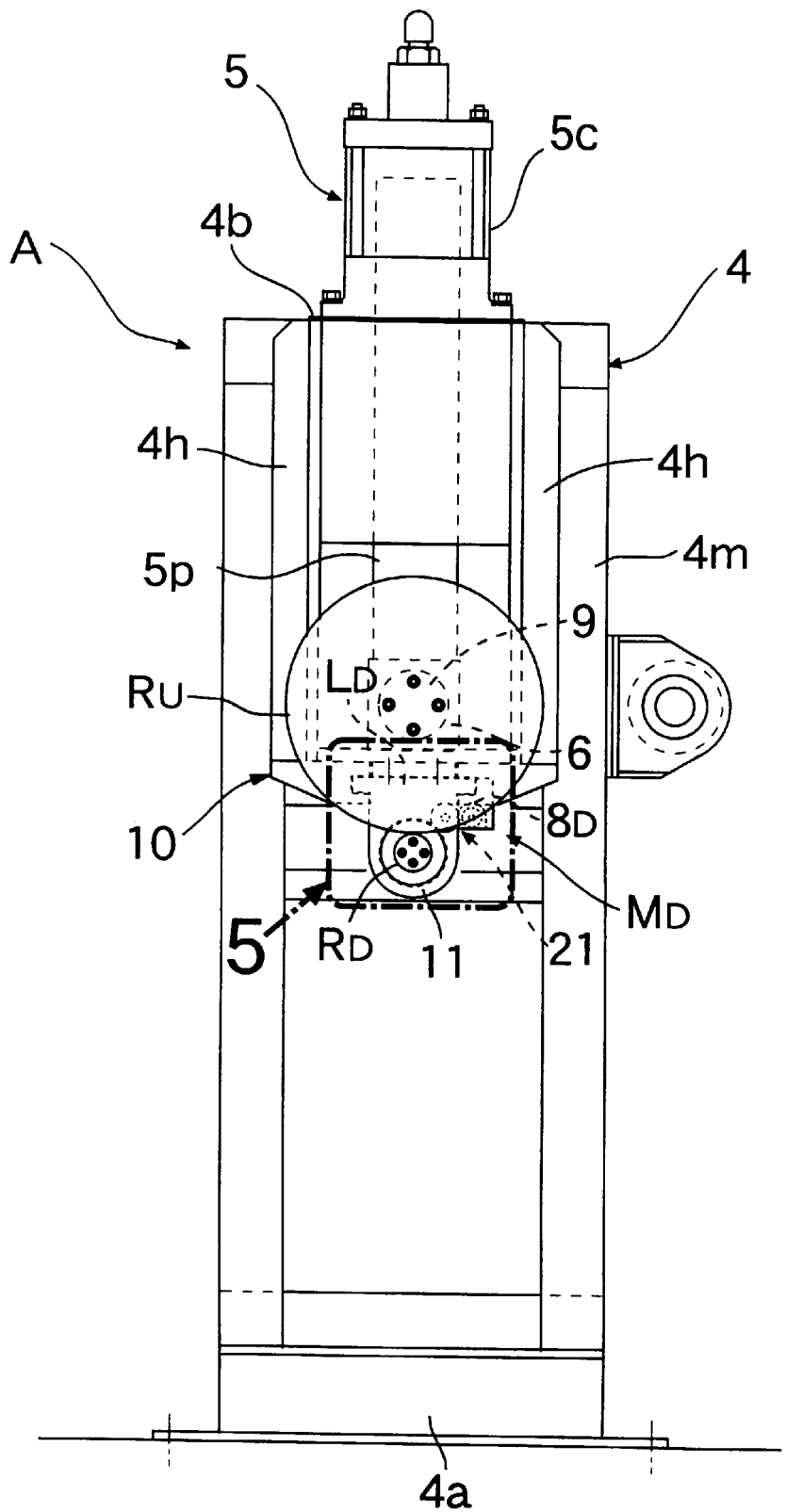
FIG. 4 is a front view of the entire arrangement of the seam-welding machine (a view taken in a direction of an arrow 4 in FIG. 3)
Figure 5:
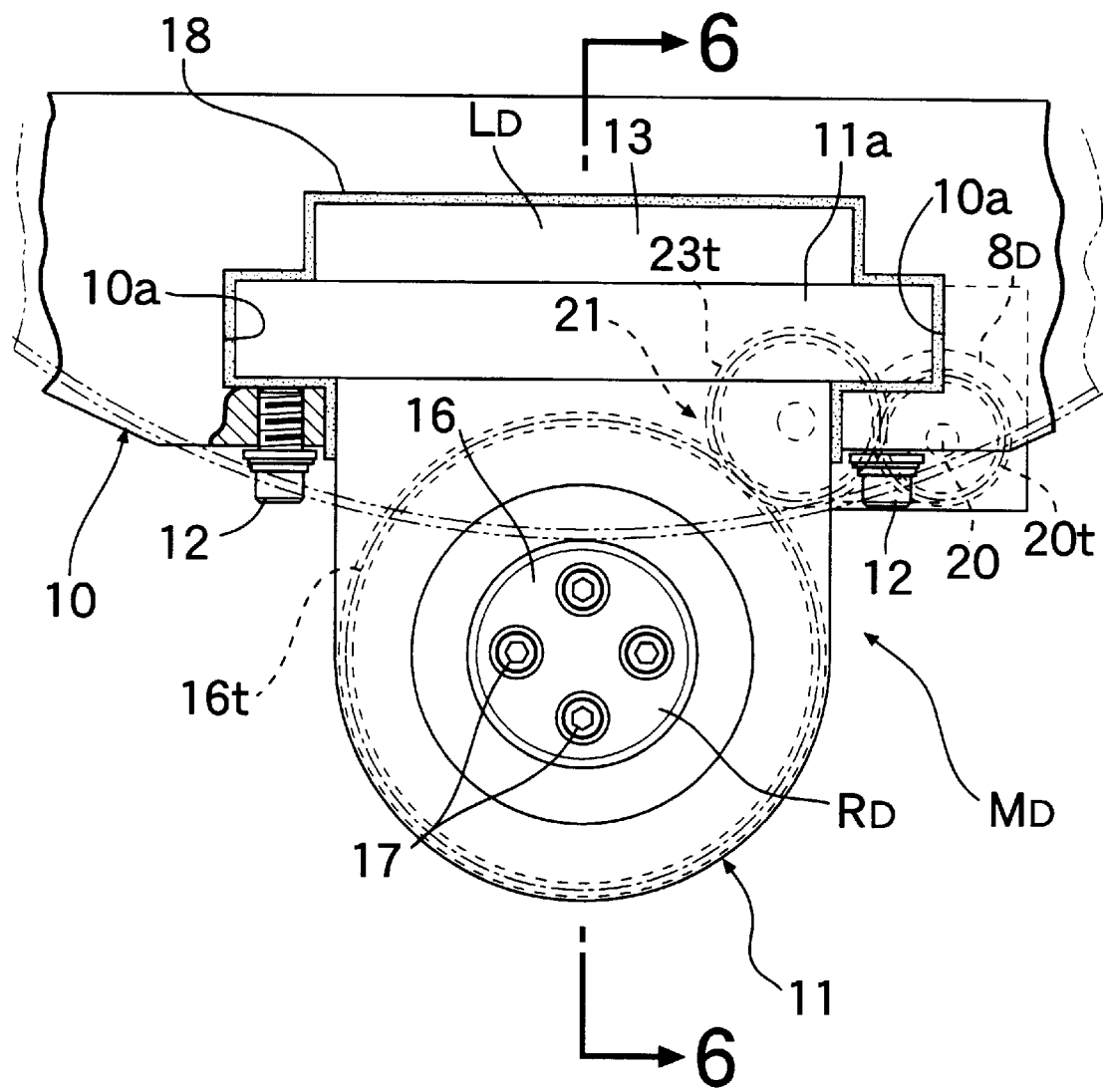
FIG. 5 is an enlarged front view of a lower electrode ring and portions around the lower electrode ring (an enlarged view taken in a direction of an arrow 5)
Figure 6:
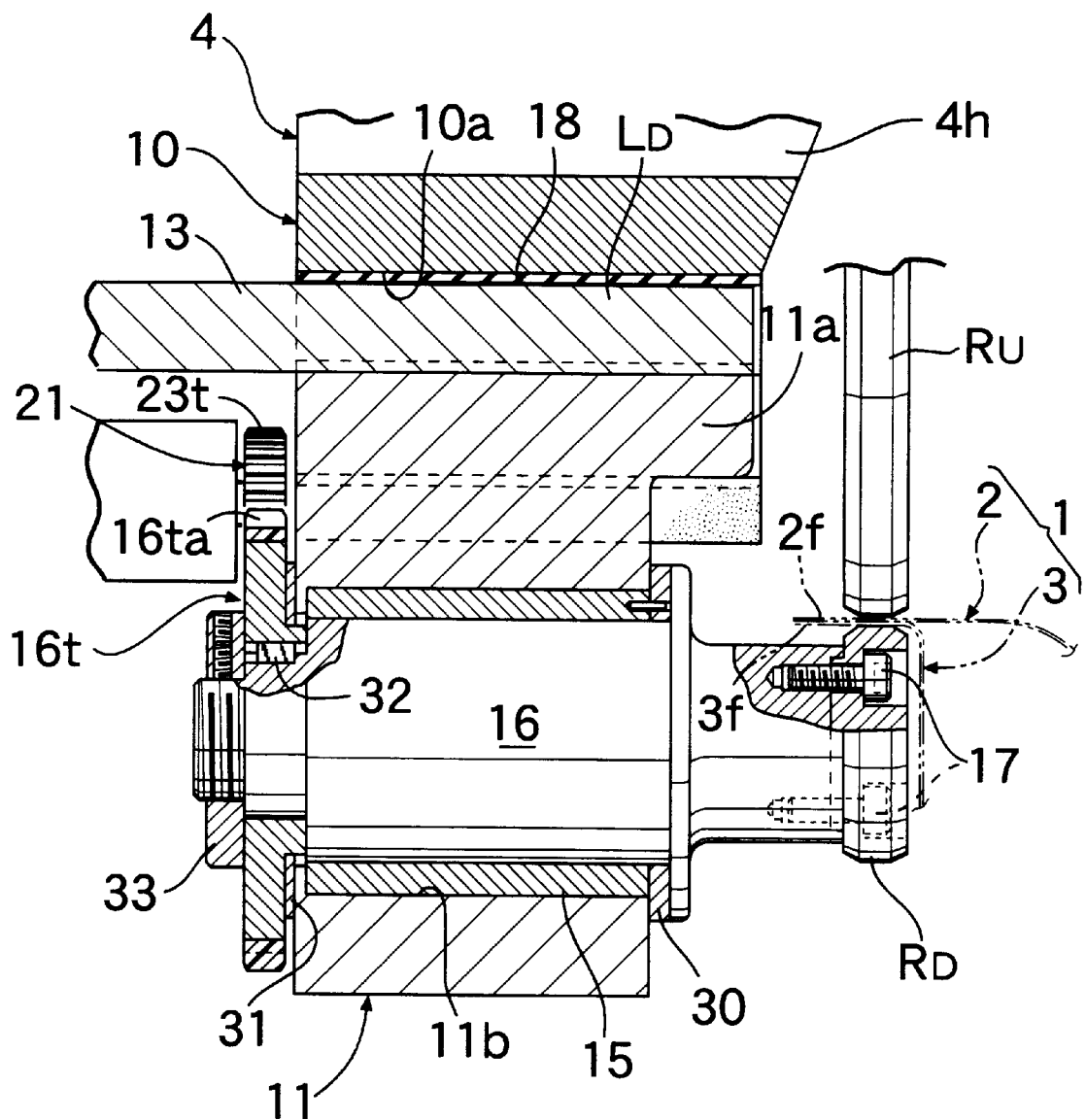
FIG. 6 is a sectional view taken along a line 6—6 in FIG. 5.

The structure of an embodiment of a seam-welding machine for welding the junction flange portions 2f and 3f will be described with reference to FIGS. 2 and 6. A frame 4 of the welding machine A shown in FIG. 3 includes a frame body 4m rising on one side of a base 4a. A support flame portion 4b is integrally cantilever-supported on an upper portion of the frame body 4m and extends horizontally, so that it is opposed to an upper surface of the base 4a. Mounted to the support frame section 4b in the following manner are a liftable upper electrode ring $R_U$, and a non-liftable lower electrode ring $R_D$ which is disposed below the upper electrode ring $R_U$. The upper electrode ring $R_U$ can be moved toward and away from the lower electrode ring $R_D$, which is formed at a diameter smaller than that of the upper electrode ring $R_U$.

A cylinder portion 5c of an expansion cylinder 5, as a lifting and lowering drive means, is disposed vertically and fixed to a central portion of a tip end of the support frame section 4b. An upper electrode support 6 is integrally retained at a lower end of a piston rod 5p of the cylinder 5. A horizontal upper electrode shaft 7 is rotatably fitted into and supported in the upper electrode support 6. The larger-diameter upper electrode ring $R_U$, which is made of an electrically conductive material, is secured to a tip end of the shaft 7. If the cylinder 5 is expanded or contracted, the upper electrode support 6 and the upper electrode ring $R_U$ can be lowered or lifted in response to the expansion or contraction of the cylinder 5 and thus advanced and retreated relative to the lower electrode ring $R_D$.

A rotatively driving device $M_U$ for an upper electrode is disposed on the frame 4m in correspondence to the upper electrode shaft 7. The rotatively driving device $M_U$ includes a motor $_8U$ and a reducing mechanism R connected to an output shaft of the motor. An output shaft Ra of the reducing mechanism R is opposed to a base end of the upper electrode shaft 7. The shafts Ra and 7 are operatively connected to each other through a rotation-interlocking mechanism I which is adapted to operatively rotate the shafts Ra and 7 in unison with each other while permitting a vertical relative displacement between the shafts Ra and 7. The rotation-interlocking mechanism I includes, in the illustrated embodiment, a pair of universal joints $J_1$ and $J_2$, and an interlocking shaft 9 which connects the joints $J_1$ and $J_2$. The interlocking shaft 9 is comprised of a pair of shaft halves $9_1$ and $9_2$ which are spline-fitted with each other, so that they can be slid relative to each other and cannot be rotated relative to each other. When the motor $_8U$ is operated, the rotation of the motor $_8U$ can be transmitted to the upper electrode shaft 7 in a reduced manner via the reducing mechanism R and the rotation-interlocking mechanism I to slowly rotate the upper electrode ring $R_U$.

A power source device E, for supplying electric current, is accommodated within the frame body 4m. Base ends of current-supplying secondary conductors $L_U$ and $L_D$ are connected to a pair of terminals of the power source device E. A tip end of one of the secondary conductors $L_U$ is connected to the upper electrode support 6, so that it can supply electric current to the upper electrode ring $R_U$. An intermediate portion of the conductor $L_U$ is formed, so that it can be resiliently deformed in response to the lifting or lowering movement of the upper electrode support 6. Thus, interference of the conductor $L_U$ with the rotation-interlocking mechanism I can be avoided.

A pair of left and right hanging frames 4h are integrally fixed in a hung-down manner to a tip end of the support frame 4b to sandwich the cylinder portion 5c of the expandable cylinder 5 therebetween from opposite sides. A horizontal support frame 10 is secured to lower ends of the hanging frames 4h to integrally couple the hanging frames 4h to each other. The support frame 10 is formed with a mounting groove 10a which opens downwards. (1) A mounting arm 11a having a T-shaped cross section and integrally formed at an upper end of the lower electrode support upper surface of the mounting arm 11a, are removably fixed in the groove 10a by a plurality of bolts 12 which urges the mounting arm 11a from below.

The entire lower electrode support 11 is formed of an electrically conductive material. A horizontal lower electrode shaft 16 is rotatably supported at its intermediate portion in a fitted manner in a bearing bore 11b defined in the support 11 through a bearing metal 15 which is formed into a thin cylindrical shape from an electrically conductive material. The lower electrode ring $R_D$ is secured by a plurality of bolts 17 to a tip end of the shaft 16 which extends from a front surface of the electrode support 11. The lower electrode ring $R_D$ and the lower electrode shaft 16 are also formed from an electrically conductive material. Therefore, the lower electrode ring $R_D$ is normally in conduction with the secondary conductor $L_D$ through the bearing metal 15 and the lower electrode support 11. The lower electrode support 11 as well as the tip end of the secondary conductor $L_D$ and the support frame 10 are normally maintained in an insulated state by an insulating plate 18. The insulating plate 18 is made of a flat insulating material and covers an inner surface of the mounting groove 10a with the entire surface thereof. Therefore, even if the lower electrode support 11 and the bearing metal 15 are conductors, there is no possibility that the lower electrode ring $R_D$ and the machine frame 4 are short-circuited therebetween.

A motor $_8D$ is mounted to a rear surface of the support frame 10 on one side of the lower electrode shaft 16 above the lower electrode ring $R_D$. A reducing gear mechanism 21, as a transmitting mechanism, is provided between the motor shaft 20 of the motor $_8D$ and the lower electrode shaft 16. Therefore, when the motor $_8D$ is operated, the rotation thereof can be transmitted in a reduced manner to the lower electrode shaft 16 to slowly rotate the lower electrode ring $R_D$. A rotatively driving device $M_D$ for a lower electrode is constituted by the reducing gear mechanism 21 and the motor $_sD$.

The reducing gear mechanism 21 comprises, in the illustrated embodiment, a reducing input gear 20t which is secured to the motor shaft 20, and a reduced output gear 16t which is secured to the base end of the lower electrode shaft 16 and which is meshed with the reducing input gear 20t through an intermediate gear 23t. A toothed portion 16ta of the reducing input gear 16t is formed from an insulating synthetic resin which is incorporated, so that the motor $_sD$ and the lower electrode ring $R_D$ can be insulated therebetween. The toothed portion 16ta constitutes an insulating means of the present invention. By the special provision of this insulating means, it is possible to prevent the lower electrode ring $R_D$ and the motor $_sD$ (motor shaft 20) from being short-circuited therebetween, even if the lower electrode support 11 and the bearing metal 15 are formed of the electrically conductive material. In FIG. 6, each of reference characters 30 and 31 is a thrust bearing; reference character 32 is a key for preventing the reducing output gear 16t from being rotated relative to the lower electrode shaft 16; and reference character 33 is a slip-off preventing nut.

A control board 22 is disposed on a side of the frame body 4m for carrying out the control of the operation of the motors $_s$u and $_s$D, the expandable cylinder 5 and the control of the supply of electric current to the electrode rings $R_U$ and $R_D$ by the power source device E.

Steps of producing the fuel tank by use of the seam-welding machine A in the embodiment will be described below.

First, a metal plate is formed by a well-known forming process (e.g., by pressing) to separately fabricate the body panel 2, which is the main portion of the fuel tank T, and the bottom plate 3. During this time, the first junction flange 2f is integrally formed on the peripheral edge of the opening 2a at the lower end of the body panel 2, and the second junction flange 3f is integrally formed on the outer peripheral edge of the bottom plate 3. In this case, the junction flanges 2f and 3f are formed turned toward the center of the opening 2a at the lower end of the body panel 2, i.e., turned inwards, so that they are superposed on each other upon setting of the bottom plate 3 on the body panel 2, and so that the flanges 2f and 3f are not visible from the sides of the tank. The fuel supplying tube 3i, which is fabricated at a different step, is secured to the body panel 2 by securing means such as welding.

Figure 7:
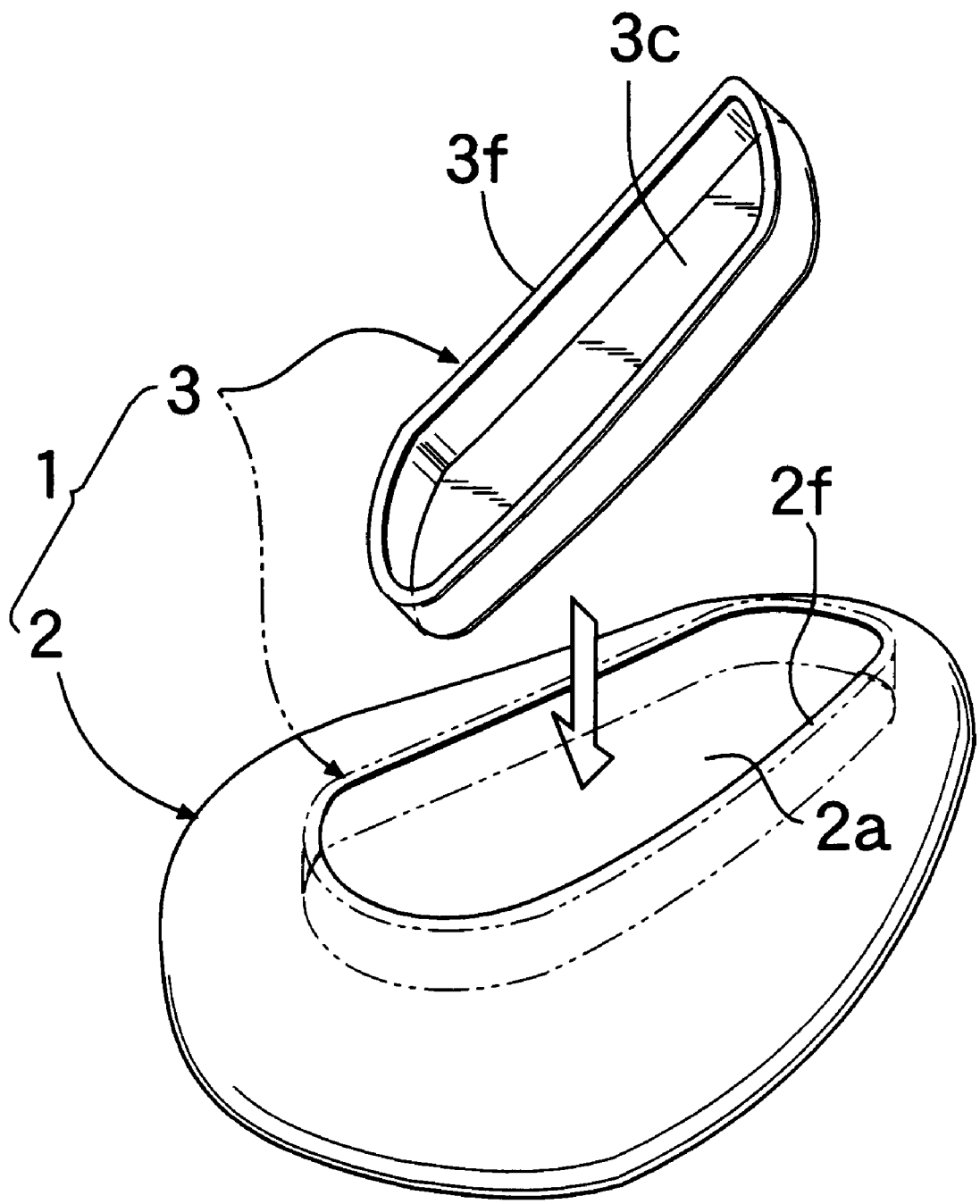
FIG. 7 is a perspective view for explaining a step of temporarily fixing a body panel and a bottom plate.
Figure 8A:
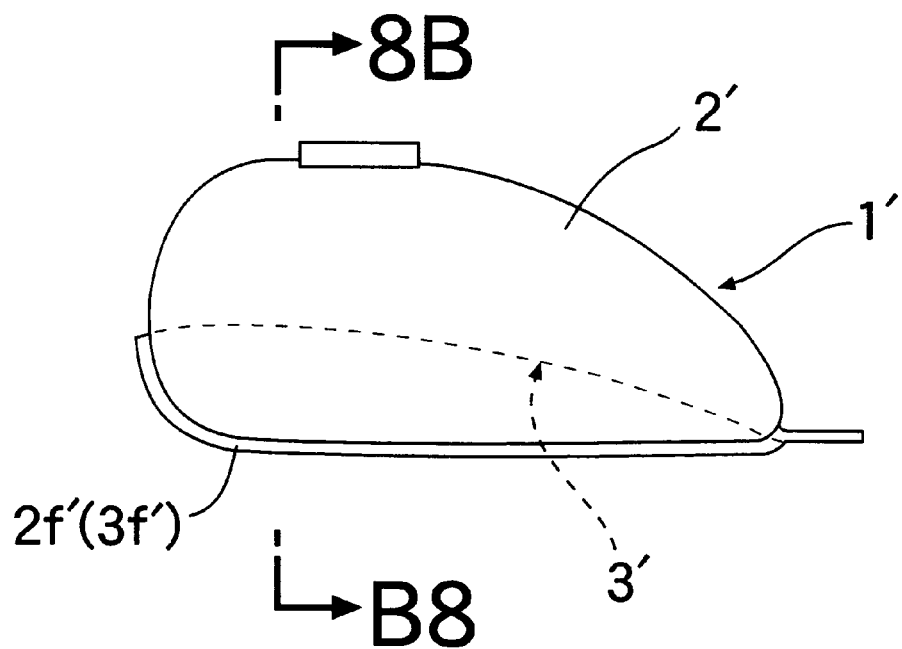
FIG. 8A is a side view of a conventional fuel tank.
Figure 8B:
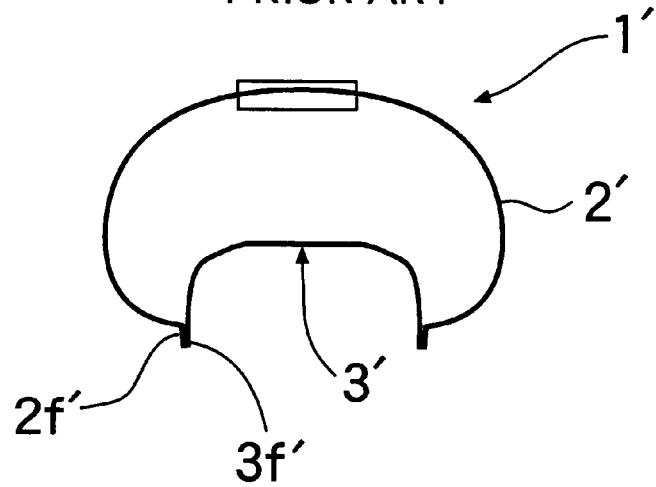
FIG. 8B is a sectional view taken along a line B—B in FIG. 8A.

Then, the bottom plate 3 is set at a predetermined position within the body panel 2. For this setting operation, first, the bottom plate 3 is placed, while being tilted longitudinally and laterally into an internal space in the body panel 2, which is turned upside down as shown in FIG. 7, through the opening 2a at the lower end of the panel 2. Then, the bottom plate 3 is retained using a retaining tool (not shown) such as a sucker, whereby the first junction flange 2f of the panel 2 and the second flange 3f of the bottom plate 3 are superposed on each other. The body panel 2 and the bottom plate 3 are temporarily fixed, so that the superposed state is maintained, thereby temporarily assembling the tank body 1. For the temporary fixing, a conventionally well-known temporary fixing means used for temporarily fixing members to be welded to each other in a common welding step, e.g., a bonding means such as adhesion, brazing, spot-welding and the like, may be employed. Alternatively, a coupling means such as clip may be used.

Then, the tank body 1, in the temporarily fixed state, is moved immediately below the lower electrode ring $R_D$ and the lower electrode support 11, while being manually supported upside down by an operator. The lower electrode ring $R_D$ and the lower electrode support 11 are placed down into the recessed portion 3c of the bottom plate 3, and the lower surface of the second junction flange 3f of the bottom plate 3 is applied to an upper end of an outer periphery of the lower electrode ring $R_D$. Thereafter, the expandable cylinder 5 is expanded lowering the upper electrode support 6, thereby bringing the upper electrode ring $R_U$ lying outside the tank (above the body panel 2) into pressing contact with the upper surface of the first junction flange 2f of the body panel 2. Thus, the superposed portions of the junction flanges 2f and 3f can be clamped between the upper and lower electrode rings $R_U$ and $R_D$.

Subsequently, the motors $_s$u and $_s$D of the upper and lower rotatively driving devices $M_U$ and $M_D$ are operated to synchronously rotate the upper and lower electrode rings $R_U$ and $R_D$, so that their outer peripheral speeds are equal to each other, while at the same time, supplying electric current to the electrode rings $R_U$ and $R_D$ from the power source device E through the conductors $L_U$ and $L_D$. Moreover, the tank body 1 is gradually fed along the superposed portions of the junction flanges 2f and 3f by the operator in accordance with the rotation of the upper and lower electrode rings $R_U$ and $R_D$, whereby the upper and lower electrode rings $R_U$ and $R_D$ are rolled on the corresponding junction flanges 2f and 3f. In this manner, junction flanges 2f and 3f can be seam-welded at W to each other. When welding W has been performed over the entire peripheries of the junction flanges 2f and 3f, the body panel 2 and the bottom plate 3 are bonded to each other and thus, the assembling of the tank body is completed.

In this case, the lower electrode ring $R_D$ is formed at a diameter sufficiently smaller than that of the upper electrode ring $R_U$, whereby a reduction in size of the lower electrode ring $R_D$ is provided. Moreover, the lower electrode shaft 16 is supported on the lower electrode support 11 with the thin disk-shaped bearing metal 15, and electrical conduction between the lower electrode support 11 and the lower electrode shaft 16 (and thus, the lower electrode ring $R_D$) is performed directly through the bearing metal 15. Thus, simplification in structure and reduction in size of the lower electrode support 11 itself are correspondingly provided. Therefore, the lower electrode support 11 which is reduced in size and the lower electrode ring $R_D$ can be non-forcedly placed down into the upward turned recessed portion 3c of the bottom plate 3. Moreover, since the lower electrode support 11 is supported on the machine frame 4 (the support frame 4b) in the hung-down manner from above, a sufficiently wide welding space is ensured on all sides and below the lower electrode ring $R_D$ and the lower electrode support 11. Thus, when the operator moves the tank body 1 while manually supporting it by hand, there is no possibility that the tank body 1 interferes with various portions of the welding machine A.

In the description of the embodiment, during seam-welding of the junction flanges 2f and 3f of the tank body 1 to each other, the operator moves the tank body 1 along a welding line, while supporting it by hand. However, the tank body 1 may be supported by an automated feeding machine such as a robot and moved along a welding line.

In the description of the embodiment, the first junction flange 2f is formed over the entire periphery of the peripheral edge of the opening 2a at the lower end of the body panel, and the second junction flange 3f is formed over the entire periphery of the outer peripheral edge of the bottom plate 3. However, the junction flanges 2f and 3f may be formed on only one portion of these peripheral edges. Also, a cooling liquid passage may be provided on each of the electrode supports 6 and 11 to cool the electrode supports 6 and 11 and the electrode rings $R_U$ and $R_D$ during welding by circulation of a cooling liquid within each of the electrode supports 6 and 11. In addition, an oil channel for flowing of a lubricating oil, if required, may be defined in the inner peripheral surface (bearing surface) of the bearing metal 5.

Although the embodiment of the present invention has been described, it will be understood that the present invention is not limited to the above-described embodiment, and various modifications may be made without departing from the spirit and scope of the invention defined in claims.

What is claimed is:

1. A process for producing a fuel tank for a motorcycle, comprising the steps of:

temporarily fixing a body panel and a bottom plate in a state in which junction flanges thereof have been turned toward a center of an opening at a lower end of said body panel;

superposing said junction flanges on each other; and seam-welding said junction flanges to each other over their entire peripheries after the temporary fixing, wherein said seam-welding including the steps of placing one of a pair of electrode rings of a seam-welding machine and at least a portion of an electrode support for rotatably supporting said one electrode ring down into a recessed portion of said bottom plate, and sandwiching said junction flanges between said one electrode ring and the other electrode ring which is disposed outside said body panel.

* * * * *

UNITED STATES PATENT AND TRADEMARK OFFICE
CERTIFICATE OF CORRECTION

PATENT NO. : 6,069,337
DATED : May 30, 2000
INVENTOR(S) : Takase et al.

It is certified that error appears in the above-identified patent and that said Letters Patent is hereby corrected as shown below:

Title page,
Change the title of the invention from "FUEL TANK FOR MOTORCYCLE, AND PROCESS FOR PRODUCING THE SAME" to -- PROCESS FOR PRODUCING A FUEL TANK FOR A MOTORCYCLE --.

Under the International Subject Matter Classification 51 related to International Classification, change "A23K" to -- B23K --.

Column 1,
Line 1, change the title of the invention from "FUEL TANK FOR MOTORCYCLE, AND PROCESS FOR PRODUCING THE SAME" to -- PROCESS FOR PRODUCING A FUEL TANK FOR A MOTORCYCLE --.

Signed and Sealed this

Ninth Day of October, 2001

*Attest:*

*Attesting Officer*

NICHOLAS P. GODICI
*Acting Director of the United States Patent and Trademark Office*